(12) United States Patent
Kato et al.

(10) Patent No.: US 11,739,396 B2
(45) Date of Patent: Aug. 29, 2023

(54) POWDER MATERIAL AND METHOD FOR MANUFACTURING MOLDED ARTICLE

(71) Applicant: FUJIMI INCORPORATED, Kiyosu (JP)

(72) Inventors: Nobuaki Kato, Kiyosu (JP); Hiroyuki Ibe, Kiyosu (JP); Junya Yamada, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 132 days.

(21) Appl. No.: 17/036,259

(22) Filed: Sep. 29, 2020

(65) Prior Publication Data

US 2021/0094097 A1 Apr. 1, 2021

(30) Foreign Application Priority Data

Sep. 30, 2019 (JP) ................. 2019-180440

(51) Int. Cl.
*C22C 1/051* (2023.01)
*B33Y 10/00* (2015.01)
(Continued)

(52) U.S. Cl.
CPC .............. *C22C 1/051* (2013.01); *B22F 1/148* (2022.01); *B22F 10/00* (2021.01); *B33Y 10/00* (2014.12);
(Continued)

(58) Field of Classification Search
CPC .. B22F 10/00; B22F 2301/15; B22F 2302/10; B22F 1/148; B22F 9/026; B22F 10/28;
(Continued)

(56) References Cited

U.S. PATENT DOCUMENTS

2015/0217378 A1 8/2015 Tatsuoka
2017/0066056 A1* 3/2017 Ronnheden ............. C22C 29/06
(Continued)

FOREIGN PATENT DOCUMENTS

CN 110453112 A 11/2019
JP 2010-012552 A 1/2010
(Continued)

OTHER PUBLICATIONS

Extended European Search Report issued in corresponding European Application No. 20195479.9 dated Dec. 2, 2020.

*Primary Examiner* — John A Hevey
(74) *Attorney, Agent, or Firm* — Foley & Lardner LLP

(57) ABSTRACT

To provide a powder material for additive layer manufacturing capable of molding a three-dimensional shaped molded article having less cracking or chipping and having high hardness and a method for manufacturing a molded article using the powder material.

A powder material for additive layer manufacturing used to manufacture a three-dimensional shaped molded article by irradiation with a laser light or an electron beam contains cobalt, a first component containing one or more substances selected from the group consisting of vanadium carbide, niobium carbide, and molybdenum carbide, an optional additive component, and the balance of tungsten carbide. The content of the first component is 0.6% by mass or more and 5% by mass or less.

8 Claims, 2 Drawing Sheets

(51) Int. Cl.
  *B33Y 70/10*       (2020.01)
  *B22F 10/00*       (2021.01)
  *B22F 1/148*       (2022.01)
  *B23K 26/342*      (2014.01)
  *B23K 15/00*       (2006.01)

(52) U.S. Cl.
  CPC ........... *B33Y 70/10* (2020.01); *B22F 2301/15* (2013.01); *B22F 2302/10* (2013.01); *B23K 15/0086* (2013.01); *B23K 26/342* (2015.10)

(58) Field of Classification Search
  CPC .... B33Y 10/00; B33Y 70/10; B23K 15/0086; B23K 26/342; Y02P 10/25; C22C 29/067; C22C 29/08; C22C 1/051
  See application file for complete search history.

(56) References Cited

U.S. PATENT DOCUMENTS

| | | | |
|---|---|---|---|
| 2017/0189960 A1 | 7/2017 | Ibe | |
| 2018/0236687 A1* | 8/2018 | Prichard | ............... B33Y 10/00 |
| 2018/0369909 A1 | 12/2018 | Ibe | |
| 2019/0001556 A1 | 1/2019 | Ibe | |
| 2019/0003019 A1 | 1/2019 | Ibe | |

FOREIGN PATENT DOCUMENTS

| | | |
|---|---|---|
| JP | 2017-113952 A | 6/2017 |
| JP | 2017-114716 A | 6/2017 |
| JP | 2017-115194 A | 6/2017 |
| KR | 20170093402 A | 8/2017 |
| WO | WO-2015/194678 A1 | 12/2015 |

\* cited by examiner

POWDER MATERIAL AND METHOD FOR MANUFACTURING MOLDED ARTICLE

CROSS-REFERENCE TO RELATED APPLICATIONS

This application claims priority to Japanese Patent Application No. 2019-180440, filed on Sep. 30, 2019, the disclosure of which is herein incorporated by reference in its' entirety.

BACKGROUND OF THE INVENTION

Field of the Invention

The present invention relates to a powder material and a method for manufacturing a molded article.

Description of the Related Art

According to an additive manufacturing technology, an object is produced by applying materials based on the numerical representation of a three-dimensional shape (typically 3D CAD data). Typically, powder materials (Additive Manufacturing materials) are joined or sintered as thin layers having a shape corresponding to the cross section of a molded article to be molded, and then the thin layers are successively laminated, so that a target three-dimensional shape is molded. In the additive manufacturing, an improvement of an additive layer manufacturing technology of directly molding a cemented carbide member using cemented carbide powder material, such as a WC base, without requiring a molding die has been demanded in recent years (for example, see PTLS 1 to 4).

CITATION LIST

Patent Literature

PTL 1: WO 2015/194678
PTL 2: JP 2017-113952 A
PTL 3: JP 2017-114716 A
PTL 4: JP 2017-115194 A

SUMMARY OF THE INVENTION

In an additive layer manufacturing method, a technology of manufacturing a molded article having less cracking or chipping and having high hardness has been desired.

Herein, the present inventors have examined, with respect to powder material for additive layer manufacturing used to manufacture a three-dimensional shaped molded article by irradiation with a laser light or an electron beam, the relation between components and contents of additives and the physical properties of a molded article molded from the powder material. As a result, the present inventors have found that a molded article having less cracking or chipping and having high hardness can be modeled by regulating the components and the contents of the additives under specific conditions.

The present invention has been made in view of the above-described problems. It is an object of the present invention to provide a powder material for additive layer manufacturing capable of molding a three-dimensional shaped molded article having less cracking or chipping and having high hardness and a method for manufacturing a molded article using the powder material.

A powder material according to one aspect of the present invention is a powder material for additive layer manufacturing used to manufacture a three-dimensional shaped molded article by irradiation with a laser light or an electron beam and contains cobalt, a first component containing one or more substances selected from the group consisting of vanadium carbide, niobium carbide, and molybdenum carbide, an optional additive component, and the balance of tungsten carbide, in which the content of the first component is 0.6% by mass or more and 5% by mass or less.

A method for manufacturing a molded article according to one aspect of the present invention includes performing three-dimensional molding using the powder material by irradiation with a laser light or an electron beam.

The present invention can provide a powder material for additive layer manufacturing capable of molding a molded article having less cracking or chipping and having high hardness and a method for manufacturing a molded article using the powder material.

DESCRIPTION OF THE PREFERRED EMBODIMENTS

Definition

Figure 1:
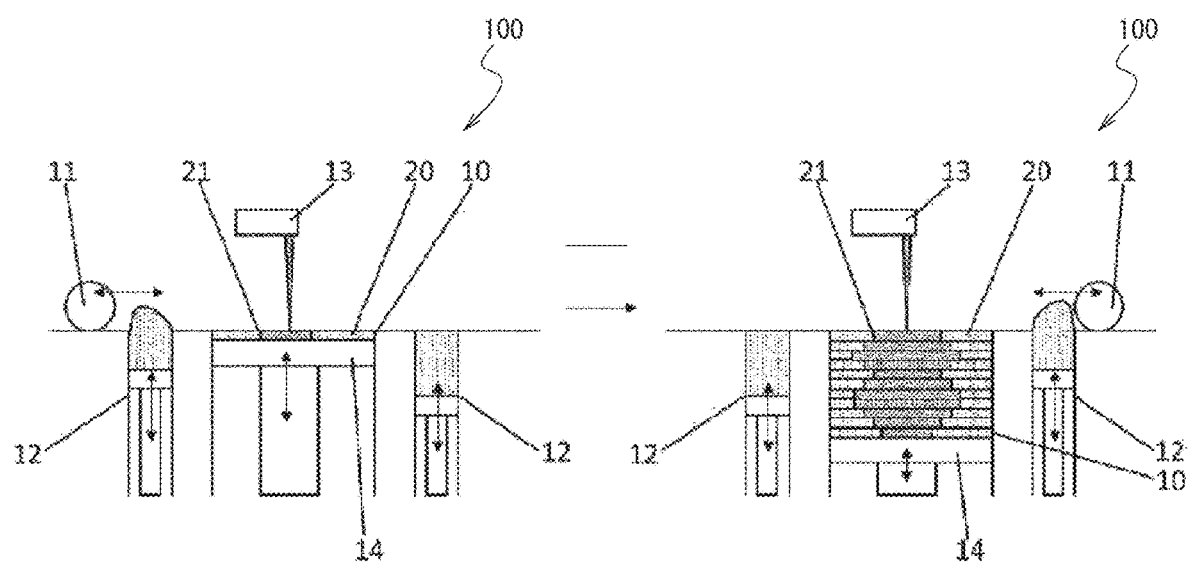
FIG. 1 is a schematic view illustrating a configuration example of an additive layer manufacturing apparatus for carrying out a method for manufacturing a molded article according to an embodiment of the present invention.

In this specification, a "powder material" refers to a powdery material used for additive layer manufacturing. The powder material may be referred to as a molding material. The powder material typically contains an aggregate of secondary particles described later. However, it is a matter of course that the mixing of primary particles described later is permitted. In this specification, the "primary particle" means the minimum unit discriminable as a particulate substance from the appearance among morphological constituent components configuring the powder material. In particular, the "primary particle" refers to one particle (one particulate substance) configuring the secondary particles described later.

In this specification, the "secondary particle" means a particulate substance (substance having the form of a particle) in which the primary particles are three-dimensionally bonded and integrated to behave like one grain. The "bond" used herein refers to the fact that two or more primary particles are directly or indirectly connected. For example, a bond of the primary particles by a chemical reaction, a bond in which the primary particles are attracted to each other by simple adsorption, a bond of the primary particles utilizing an attraction effect by static electricity, a bond in which the primary particle surfaces are melted and integrated, and the like are included.

In this specification, "raw material particles" refer to particles configuring a raw material powder for forming the powder material. The secondary particles can be manufactured by three-dimensionally bonding the raw material particles by an appropriate method. Particles configuring the secondary particles thus manufactured are referred to as the primary particles. The primary particles may have almost the same form as that of the raw material particles or may have a form different from that of the raw material particles due to the fact that two or more raw material particles are reacted or integrated to such an extent that the raw material particles cannot be morphologically distinguished from each other, for example. The primary particles may have the same composition as that of the raw material particles or may have a composition different from that of the raw material particles due to the fact that two or more kinds of raw material particles are reacted, for example.

In this specification, the "additive layer manufacturing" widely includes various kinds of molding methods using the powder material in the additive manufacturing technology. The additive layer manufacturing may also be referred to as powder bed fusion. Examples of a method for bonding the in the additive layer manufacturing include, for example, beam irradiation systems, such as a laser metal deposition method (LMD), a selective laser melting method (SLM), and an electron beam melting method (EBM).

In this specification, "X-Y" illustrating a range means "X or more and Y or less".

The present invention is not limited only to the following embodiment. The dimension ratio of the drawings is exaggerated for convenience of explanation and is different from the actual ratio in some cases.

<Configuration>

(Composition)

The powder material according to the embodiment of the present invention (hereinafter referred to as this embodiment) contains, as the raw material particles, (1) cobalt (Co),
(2) a first component containing one or more substances selected from the group consisting of vanadium carbide (VC), niobium carbide (NbC), and molybdenum carbide ($Mo_2C$),
(3) an optional additive component, and
(4) the balance of tungsten carbide (WC).

The raw material particles (1) to (4) above are bonded by sintering to configure a granulated-sintered powder. It can be understood that the powder material according to this embodiment contains the raw material particles (1) to (4) above as the primary particles and the granulated-sintered powder has the form of the secondary particle. The raw material particles (1) to (4) above configure the secondary particles in a state of being substantially uniformly mixed and dispersed. It is a matter of course that the raw material particles (1) to (4) above are permitted to be contained in the form of the primary particles (for example, 10% by mass or less) in such a powder material.

In the powder material according to this embodiment, the cobalt content is preferably 5% by mass or more, more preferably 10% by mass or more, and still more preferably 15% by mass or more, for example. In the powder material according to this embodiment, the cobalt content is preferably 50% by mass or less, more preferably 35% by mass or less, and still more preferably 25% by mass or less, for example. When the cobalt content is in the numerical ranges above, a dense molded article having high strength can be produced.

In the powder material according to this embodiment, the first component content is preferably 0.6% by mass or more, more preferably 1% by mass or more, and still more preferably 1.5% by mass or more. When the first component content is 0.6% by mass or more, the particle growth (for example, Ostwald ripening) of the tungsten carbide can be suppressed in performing the three-dimensional molding using the powder material according to this embodiment by irradiation with a laser light or an electron beam and the hardness of a three-dimensional shaped molded article (hereinafter also referred to as "three-dimensional molded article") can be increased. In the three-dimensional molded article, the hardness of the three-dimensional molded article becomes higher when the tungsten carbide particles are finer and more uniformly distributed.

In the powder material according to this embodiment, the first component content is preferably 5% by mass or less, more preferably 3% by mass or less, and still more preferably 2.5% by mass or less. The first component suppresses the particle growth of the tungsten carbide. However, when the first component content exceeds 5%, the strength of the three-dimensional molded article tends to decrease. When the first component content is 5% by mass or less, the particle growth of the tungsten carbide can be suppressed while suppressing a strength reduction.

In the powder material according to this embodiment, the optional additive component includes a second component serving as a carbon supply source, for example. The second component contains one or more substances selected from the group consisting of titanium carbide (TiC), chromium carbide (CrC), and carbon (C). The CrC is one or more kinds of $Cr_3C_2$, $Cr_7C_3$, and $Cr_{23}C_6$, for example.

In the powder material according to this embodiment, the second component content is preferably 0.1% by mass or more, more preferably 1% by mass or more, and still more preferably 1.5% by mass or more. In the powder material according to this embodiment, the second component content is preferably less than 5% by mass, more preferably 3% by mass or less, and still more preferably 2.5% by mass or less.

In the additive layer manufacturing using a laser light or an electron beam, the powder material is locally heated to a high temperature in a short time as compared with common powder metallurgy. When the tungsten carbide is irradiated with a laser light or an electron beam, apart of C volatilizes from WC, so that tungsten carbide in which C is insufficient (i.e., W-rich) (W:C=1:n, n<1) is likely to be generated. This phenomenon is particularly remarkable in the additive layer manufacturing using a laser light or an electron beam. When the W-rich tungsten carbide reacts to cobalt, an η phase (fragile phase) in which C is insufficient and the strength decreases is likely to be generated in cemented carbide containing WC—Co as the main component.

However, when the second component content is in the numerical ranges above, C is supplied to the tungsten carbide from the second component. Therefore, the generation of the η phase is suppressed in the cemented carbide. This can improve the denseness and the moldability of the three-dimensional molded article. In the three-dimensional molded article, the occurrence of cracking or chipping can be suppressed.

The second component serving as the carbon supply source may also be only carbon (C). In addition to the second component, carbon may be added to the powder material. When carbon is used not in the form of a compound but in the form of an element simple substance as the carbon supply source, it is sufficient that the content of the carbon as the second component in the powder material is 0.1% by mass or more. Due to the fact that the carbon content is 0.1% by mass or more, the powder material according to this embodiment can sufficiently supply carbon to the tungsten carbide and can suppress the occurrence of cracking or chipping.

(Granulated-Sintered Powder)

The powder material according to this embodiment may be configured as an aggregate of the granulated-sintered powders in the form of the secondary particles as described above. The "granulated-sintered powder" refers to a particulate substance (having the form of a particle) in which the primary particles are sintered and integrated to behave as one grain. The "sintering" refers to a state where the primary particles are directly bonded to each other. Therefore, the sintering may be either solid phase sintering or liquid phase sintering. The sintering as used in this specification may include so-called fusion bonding and melting and bonding.

The powder material according to this embodiment may be realized by firm integration of the primary particles through sintering in the secondary particles (particle aggregate) having the form of granular particles, fine particle-coated particles obtained by bonding of fine particles around a core particle, or the like, for example. As the energy source in the additive layer manufacturing, a laser light, an electron beam, an arc, and the like are used. When the powder material is irradiated with a laser light, an electron beam, or the like, high energy is released, so that an impact can be caused in the powder material. There is a risk that mere granular particles may be collapsed or the primary particles may be scattered due to the impact. To avoid the generation of such a situation, the granular particles are configured as a so-called granulated-sintered powder in which the primary particles are bonded to each other by sintering. The granulated-sintered powder is preferable because, even in a case where the granulated-sintered powder is irradiated with a laser light having higher intensity or the like as the energy source, the collapse, scattering, or the like of the powder material is hard to occur. This fact is preferable because this fact may lead to an increase in molding rate (for example, the laser scanning rate may be increased or there is no necessity of reducing the laser scanning rate) without impairing the molding accuracy and the quality of a molded article.

(Granule Strength)

The strength of the granular particles (hereinafter referred to as "granule strength") in the granulated-sintered powder can be regulated to exceed 1 MPa. This can suitably suppress the collapse or the scattering of the granulated-sintered powder due to energy for the molding. As a result, the supply of the powder material to a molding area is stabilized, and therefore a high-quality molded article free from unevenness can be molded, and therefore the granule strength is preferable. The granule strength of the granulated-sintered powder is preferably 1 kg/mm$^2$ or more, more preferably 5 kg/mm$^2$ or more, and still more preferably 10 kg/mm$^2$ or more (for example, 20 kg/mm$^2$ or more). However, excessively high granule strength is not preferable because it becomes difficult to sufficiently melt the powder material. Moreover, in the granulated-sintered powder having excessively high granule strength, sintering proceeds until a configuration similar to that of a single particle which is not substantially granulated is formed, so that the properties thereof are similar to those of spheroidized particles. From such a viewpoint, the granule strength is set to less than 1000 kg/mm$^2$. The granule strength is preferably 500 kg/mm$^2$ or less, more preferably 250 kg/mm$^2$ or less, and still more preferably 100 kg/mm$^2$ or less (for example, 80 kg/mm$^2$ or less).

In the powder material (for example, granulated-sintered powder) according to this embodiment, the raw material particles (1) to (4) above (typically primary particles) are three-dimensionally bonded to each other to configure the granulated-sintered powder. Due to the structure, the powder material has advantages of easily receiving energy from the energy source (heat source) and being easily dissolved. As a result, a molded article can be obtained which has high denseness and high hardness similar to a sintered compact (bulk body) manufactured using a mold, for example.

In particular, the powder material according to this embodiment contains not only the tungsten carbide but the cobalt having a melting point lower than that of the tungsten carbide. Two or more of the primary particles configuring the powder material are three-dimensionally bonded. Thus, the melting of the cobalt precedently occurs in the powder material, so that a melt of the cobalt can wet and spread over the surface of the tungsten carbide. Alternatively, the tungsten carbide in a dispersion state can be taken into a matrix obtained by the melting of the tungsten carbide. This promotes the melting of the tungsten carbide, so that a dense molded article can be obtained. Alternatively, a dense molded article in the form in which a phase of the tungsten carbide is dispersed in a phase of the cobalt can be obtained.

(Average Particle Diameter)

The average particle diameter of the powder material (for example, granulated-sintered powder) according to this embodiment is not particularly limited and can be set to a size suitable for the standard of an additive layer manufacturing apparatus to be used. For example, the average particle diameter of the powder material may have a size suitable for the supply of the powder material in the additive layer manufacturing. When the average particle diameter of the powder material is set larger, the upper limit of the average particle diameter of the powder material can be set to exceed 200 μm, for example. The average particle diameter of the powder material can be typically set to 200 μm or less, preferably 150 μm or less, more preferably 100 μm or less, and still more preferably 40 μm or less. With respect to the powder material, the packing fraction of the powder material may be increased in the molding area, for example, with a reduction in the average particle diameter. As a result, the denseness of the three-dimensional molded article to be molded can be suitably increased. Moreover, effects that the surface roughness (Ra) of the three-dimensional molded article to be molded can be reduced and the dimensional accuracy is improved can also be obtained.

The lower limit of the average particle diameter of the powder material is not particularly limited insofar as the flowability of the powder material is not affected. However, when the handling in forming the powder material or the flowability of the powder material is considered, the lower limit of the average particle diameter can be set to 1 μm or more, preferably 5 μm or more, and more preferably 10 μm or more. The flowability of the powder material is improved with an increase in the average particle diameter of the powder material. As a result, the supply of the powder material to a molding apparatus can be satisfactorily carried out and the finishing of the three-dimensional molded article to be produced is improved, and therefore the average particle diameter is preferable.

<Manufacturing Methods>

(Method for Manufacturing Powder Material)

A method for manufacturing the powder material in this embodiment is not particularly limited insofar as the raw material particles (1) to (4) above are contained and the first component content is 0.6% by mass or more and 5% by mass or less. For example, a case where the powder material is manufactured by a granulation and sintering method is described below as a suitable example. However, a method for manufacturing the molding material described herein is not limited thereto.

The granulation and sintering method is a method including granulating a powder containing the raw material particles (1) to (4) above into the form of the secondary particles, and then firing the granulated powder, thereby sintering the raw material particles (1) to (4) above. In the granulation, various kinds of known granulation methods are usable as appropriate. For example, a granulation method, such as dry granulation or wet granulation, is usable as the granulation method. Specifically, a rolling granulation method, a fluidized bed granulation method, a stirring granulation method, a crushing granulation method, a melt granulation method, a spray granulation method, a microemulsion granulation method, and the like are mentioned, for example. Among the above, the spray granulation method is mentioned as a suitable granulation method.

According to the spray granulation method, the molding material can be manufactured by the following procedure, for example. More specifically, a powder obtained by blending the raw material particles (1) to (4) above at predetermined mass ratios (hereinafter referred to as a blended powder) is first prepared. The surface thereof is stabilized with a protective agent or the like as necessary. Then, the stabilized blended powder is dispersed in a suitable solvent together with a binder, spacer particles containing organic materials and the like contained as necessary, and the like, for example, to prepare a spray liquid. The dispersion into a solvent of the raw material particles (1) to (4) above can be carried out using a mixer or a disperser, such as a homogenizer or a stirrer with blades, or the like, for example. Thus, the raw material particles (1) to (4) above are sprayed into the air current using a spraying granulator to be dried. Thus, the secondary particles in a state where the raw material particles (1) to (4) above are three-dimensionally bonded to each other by the binder can be obtained.

Subsequently, the granulated secondary particles are fired, so that the raw material particles (1) to (4) above contained in the secondary particles are sintered. Thus, the raw material particles (1) to (4) above can be firmly bonded (sintered) to each other. According to the granulation and sintering method, sintering treatment is applied to the granulated particles produced by the above-described granulation method, for example. At this time, the granulated raw material particles are sintered at mutual contacts to be sintered while substantially maintaining the granulated shape. The binder disappears in the sintering. In the system of using spacer particles, the spacer particles also disappear by the firing. Thus, the powder material containing the particles in the form of the secondary particles in which the primary particles are sintered can be obtained. In the powder material, the primary particles may have a dimension and a shape almost equal to those of the raw material particles (1) to (4) above and the raw material particles (1) to (4) above may be grown and bonded by the firing.

In the manufacturing step above, the raw material particles (1) to (4) above and the binder are in a uniform mixed state and the raw material particles (1) to (4) above are bound by the binder to configure mixed particles in the state of the granulated particles. In the system of using the spacer particles, the raw material particles (1) to (4) above and the spacer particles in the uniform mixed state are bound by the binder to configure mixed particles. Then, the mixed particles are fired, so that the binder (and the spacer particles) disappear (burned off) and the raw material particles (1) to (4) above are sintered, so that the secondary particles in the form in which the primary particles are bonded are formed.

In the sintering, the raw material particles (1) to (4) above partially form a liquid phase depending on the composition and the size thereof and may contribute to bonding with other particles. Therefore, the average particle diameter of the primary particles is larger than that of the raw material particles (1) to (4) above as starting materials in some cases. The size and the ratio of the average particle diameter of the secondary particles and the primary particles can be designed as appropriate according to a desired form of the secondary particles.

The concentration of the raw material particles (1) to (4) above in the spray liquid to be prepared in the manufacturing step above is preferably 10 to 40% by mass. Examples of the binder to be added include carboxy methyl cellulose, polyvinyl pyrrolidone, and the like, for example. The binder to be added is preferably prepared in a proportion of 0.05 to 10% by mass based on the mass of the raw material particles (1) to (4) above. The environment in which the firing is performed is not particularly limited. The firing may be performed in the atmosphere, in the vacuum, or in an inert gas atmosphere. The sintering is preferably performed at a temperature of 600° C. or more and 1600° C. or less. In particular, when the spacer particles containing organic materials and the like, the binder, and the like are used, sintering may be performed in an atmosphere in which oxygen is present for the purpose of removing the organic materials in the granulated particles. The manufactured secondary particles may be disintegrated or classified as necessary.

(Method for Manufacturing a Three-Dimensional Molded Article)

The powder material obtained as described above is applicable to various kinds of additive layer manufacturing (for example, LMD, SLM, EBM, and the like). As an example of a method for manufacturing a three-dimensional molded article, powder additive layer manufacturing is described taking a case where the selective laser melting method (SLM) is adopted as an example. The method for manufacturing a three-dimensional molded article disclosed herein includes the following steps:

(A) Step of supplying a powder material (for example, granulated-sintered powder) to a lamination area of an additive layer manufacturing apparatus;

(B) Step of planarizing the supplied powder material with a wiper or the like to be uniformly and thinly deposited on the lamination area, thereby forming a thin layer;

(C) Step of giving a means for joining and sintering, for example, the powder material to the formed thin layer of the powder material (for example, irradiating with a laser light), thereby solidifying the powder material; and (D) Step of supplying another powder material onto the solidified powder material. Then, the steps (B) to (D) are repeated after the step (A) to form a laminate, so that a target three-dimensional molded article is obtained.

The "solidified" of the step (D) includes directly bonding the secondary particles configuring the powder material to each other by melting and coagulating, thereby fixing the shape into a predetermined cross-sectional shape.

The laser metal deposition method (LMD) is a technology of providing the powder material to a desired part of a structure, and then emitting a laser light thereto to melt-coagulate the powder material, thereby performing cladding on the part. By utilizing the technology, when a physical deterioration, such as wear, occurs in the structure, for example, a material configuring the structure, a reinforcing member, or the like is supplied as the powder material to the deterioration part, and then the powder material is melted-coagulated, so that the cladding can be performed to the deterioration part or the like.

The selective laser melting method (SLM) is a technology of scanning a powder layer where the powder material is deposited with a laser light based on slice data generated from a design drawing, and then repeating an operation of melting and coagulating the powder layer into a desired shape for each one cross section (one slice data) to form a laminate, thereby molding a three-dimensional structure. The electron beam melting method (EBM) is a technology of selectively melting and coagulating the powder layer using an electron beam based on slice data generated from 3D CAD data to form a laminate, thereby molding a three-dimensional structure. All the technologies include the step of supplying the powder material which is a raw material of the structure to a predetermined molding position.

FIG. 1 is a schematic view illustrating a configuration example of an additive layer manufacturing apparatus 100 for carrying out the method for manufacturing a molded article according to the embodiment of the present invention. As illustrated in FIG. 1, the additive layer manufacturing apparatus 100 is provided with a molding area 10 which is a space where additive layer manufacturing is performed, stocks 12 storing a powder material 20, a wiper 11 assisting the supply of the powder material 20 to the molding area 10, and a solidifying means (energy supply means, such as a laser oscillator) 13 for solidifying the powder material 20.

The molding area 10 has a molding space, the outer periphery of which is surrounded, under a molding surface and is provided with a lifting table 14 which can move up and down in the molding space. The lifting table 14 can move downward by a predetermined thickness $\Delta t1$. On the lifting table 14, a target molded article is molded. The stocks 12 are disposed in the vicinity of the molding area 10 and each provided with a bottom plate (lifting table) which can move up and down by a cylinder or the like in a storage space, the outer periphery of which is surrounded, for example. The stocks 12 move up and down the bottom plates, thereby supplying (extruding) a predetermined amount of the powder material 20 to the molding surface.

The additive layer manufacturing apparatus 100 can carry out the steps (A) to (D) above. For example, the additive layer manufacturing apparatus 100 supplies the powder material 20 to the molding area 10 in a state where the lifting table 14 is lowered by the predetermined thickness $\Delta t1$ from the molding surface, thereby preparing a layer of the powder material 20 with the predetermined thickness $\Delta t1$.

Next, the additive layer manufacturing apparatus 100 causes the wiper 11 to scan the molding surface, thereby supplying the powder material 20 extruded from the stocks 12 onto the molding area 10 and planarizes the upper surface of the powder material 20, thereby forming a homogeneous layer of the powder material 20.

Next, the additive layer manufacturing apparatus 100 gives energy to a first layer of the powder material 20 formed above only in a solidification region corresponding to slice data of the first layer through the solidifying means 13, thereby melting or sintering the powder material 20 into a desired cross-sectional shape to form a first layer of a powder solidified layer 21.

Next, the additive layer manufacturing apparatus 100 lowers the lifting table 14 by the predetermined thickness $\Delta t1$, supplies the powder material 20 again, and then levels the same with the wiper 11, thereby forming a second layer of the powder material 20. Then, the additive layer manufacturing apparatus 100 gives a heat source only to a solidification region corresponding to slice data of the second layer of the powder material 20 through the solidifying means 13 to solidify the powder material 20 to form a second layer of the powder solidified layer 21. At this time, the second layer of the powder solidified layer 21 and the first layer of the powder solidified layer 21 which is a lower layer are integrated to form a laminate including up to the second layer.

Subsequently, the additive layer manufacturing apparatus 100 lowers the lifting table 14 by the predetermined thickness $\Delta t1$ to form another layer of the powder material 20, and then gives a heat source through the solidifying means 13 to form the powder solidified layer 21 in a required part. The additive layer manufacturing apparatus 100 can manufacture a target three-dimensional molded article by repeating this step.

As a means for solidifying the powder material 20, a method is selected which includes giving heat by a laser light or an electron beam to melt and solidify (including sintering) the powder material 20. For example, carbon dioxide laser or YAG laser is suitably usable.

Effects of Embodiment

As described above, the powder material according to the embodiment of the present invention is the powder material for additive layer manufacturing used to manufacture a three-dimensional shaped molded article by irradiation with a laser light or an electron beam and contains cobalt, the first component containing one or more substances selected from the group consisting of vanadium carbide, niobium carbide, and molybdenum carbide, an optional additive component, and the balance of tungsten carbide. The first component content is 0.6% by mass or more and 5% by mass or less. Thus, the particle growth of the tungsten carbide (WC) is suppressed by the first component in performing the three-dimensional molding by irradiating the powder material with a laser light or an electron beam. Hence, a three-dimensional molded article of cemented carbide containing WC—Co as the main component having less cracking or chipping and having high hardness can be molded.

The optional additive component may also contain the second component serving as the carbon supply source. The second component content is less than 5% by mass. The second component contains one or more substances selected from the group consisting of titanium carbide, chromium carbide, and carbon, for example. Thus, C is supplied to the tungsten carbide from the second component in performing the three-dimensional molding by irradiating the powder material with a laser light or an electron beam. In the additive layer manufacturing using a laser light or an electron beam, the powder material is heated to a high temperature in a short time as compared with common powder metallurgy. Therefore, C of the tungsten carbide (WC) is likely to volatilize, so that WC is likely to be brought into a state where C is insufficient (i.e., W-rich state). However, the second component supplies C to the tungsten carbide (WC)

to compensate the volatilized C. Thus, the formation of the η phase can be suppressed in the three-dimensional molded article of cemented carbide, so that the denseness and the moldability of the three-dimensional molded article can be further improved. The content of each of the first component and the second component in the powder material is preferably 1% by mass or more and 3% by mass or less from the viewpoint of the denseness and the moldability of the three-dimensional molded article.

The method for manufacturing a molded article according to the embodiment of the present invention performs the three-dimensional molding using the powder material by irradiation with a laser light or an electron beam. Thus, a three-dimensional molded article having less cracking or chipping and having high hardness can be molded.

EXAMPLES

The present invention is described in more detail using Examples and Comparative Examples described below. However, the technical scope of the present invention is not limited only to Examples described below.

<Method for Manufacturing Powder Material>

As a raw material powder, a tungsten carbide (WC) powder having an average particle diameter of 0.76 μm, a cobalt (Co) powder having an average particle diameter of 1.30 μm, a vanadium carbide (VC) powder having an average particle diameter of 4.68 μm, and a chromium carbide ($Cr_3C_2$) powder having an average particle diameter of 1.83 μm were prepared.

The prepared raw material powders were blended at ratios illustrated in Table 1 and Table 2 illustrated below to give blended powders (form of the primary particles). The obtained blended powders were wet-blended, and then granulated with a spray drier. The obtained granulated powders were sintered to produce granulated-sintered powders (form of the secondary particles). The obtained granulated-sintered powders were classified by a sieve with an opening of 25 μm. The average particle diameter, the bulk density, and the granule strength of the obtained granules after the classification were individually measured.

For the "average particle diameter" of the primary particles, the particle diameter at a cumulative value of 50% (50% volume average particle diameter; D50) in a mass-based particle size distribution measured by a particle size distribution meter based on a laser diffraction/scattering method was adopted. For the powder (tungsten carbide powder) having an average particle diameter of less than 1 μm, a value calculated as the diameter of spherical particles (equivalent spherical diameter) calculated from the specific surface area was adopted. When the specific surface area of the raw material powder is defined as Sm and the density thereof is defined as ρ, the average particle diameter (Dave) of the primary particles can be determined based on Expression: Dave=6/(ρSm). The specific surface area can be set as a value calculated by the BET method from the gas adsorption amount of $N_2$ or the like measured by a continuous flow method using a specific surface area meter (manufactured by Micromeritics Instrument Corporation, FlowSorbII 2300), for example. The specific surface area can be measured according to "Determination of the Specific Surface Area of Powders (Solids) by Gas Adsorption-BET Method" specified in JIS Z8830:2013 (1S09277:2010).

For the "average particle diameter" of the secondary particles, the particle diameter at a cumulative value of 50% (50% volume average particle diameter; D50) in a mass-based particle size distribution measured by a particle size distribution meter based on a laser diffraction/scattering method was adopted.

For the bulk density, a value measured according to "Metallic powders-Determination of apparent density" specified in JIS Z2504:2012 was adopted. Specifically, a container of a predetermined volume is filled with a powder free-flowing from an orifice of a diameter of 2.5 mm in a naturally packed state, and the mass of the powder is measured to calculate the bulk density. For the measurement of the bulk density, a value measured using a JIS bulk specific gravity meter for metal powders (manufactured by TSUTSUI SCIENTIFIC INSTRUMENTS CO., LTD.) was adopted.

For the granule strength, a value of the breaking strength of the granular particles measured using a compression testing machine of an electromagnetic load system was adopted. Specifically, the arithmetic mean value of the breaking strengths specifically measured using a microcompression testing device (manufactured by Shimadzu Corporation, MCT-500) for 10 or more optional granulated-sintered powders configuring the powder material was adopted as the granule strength. With respect to the granulated-sintered powder, when the critical load obtained in a compression test is defined as L [N] and the average particle diameter is defined as d [mm], the breaking strength σ[MPa] of the granulated-sintered powder is calculated by Expression: $\sigma = 2.8 \times L / \pi / d^2$.

<Method for Molding Three-Dimensional Molded Article>

Using the above-described powder material, the powder material which was laid flat was irradiated with a laser light by an additive layer manufacturing apparatus (Product Name: ProX DMP200, manufactured by 3D Systems), and then layers were melted one by one. By repeating this step, a three-dimensional molded article was manufactured. At this time, the output was set to 300 W, the scanning rate was set to 300 mm/s, the pitch width was set to 0.1 mm, and the lamination thickness was set to 30 μm. After the molding, the presence or absence of cracking or chipping in the three-dimensional molded article was visually evaluated.

The three-dimensional molded article manufactured by the molding method was heat-treated. The heat treatment conditions are a pressure-reduced atmosphere (10 Pa), a heating temperature of 1380° C., and heating time of 2 hours (continuous). After the heat treatment, the Vickers hardness of the three-dimensional molded article was measured. Moreover, the XRD (X-ray diffraction) measurement of the three-dimensional molded article was performed. In the XRD measurement, the peak strength) (40.07°) of $Co_3W_3C$ (η phase) and the peak strength) (35.7°) of WC were detected. Then, the presence or absence of the η phase in the three-dimensional molded article was evaluated from a detection ratio thereof ($Co_3W_3C$/WC).

<Evaluation>

Table 1 illustrates the evaluation results of Examples. Table 2 illustrates the evaluation results of Comparative Examples. "%" in Table 1 and Table 2 means "% by mass".

TABLE 1

| Sample | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Blended powder | Composition | | Balance WC 17% Co 1% VC 1% CrC | Balance WC 17% Co 2% VC 2% CrC | Balance WC 17% Co 3% VC 0.27% C | Balance WC 17% Co 3% VC 3% CrC | Balance WC 17% Co 3% VC 0.54% C | Balance WC 17% Co 0.6% VC | Balance WC 17% Co 3% VC | Balance WC 17% Co 5% VC |
| Granulated-sintered powder | Particle size distribution | D3 | 7.4 | 8.4 | 8.3 | 7.9 | 8.2 | 3.8 | 3.9 | 7.6 |
| | | D50 | 13.8 | 15.4 | 15.2 | 14.2 | 15.0 | 14.9 | 14.7 | 14.0 |
| | | D97 | 25.7 | 29.2 | 29.0 | 27.1 | 28.4 | 30.1 | 29.6 | 25.9 |
| | Bulk density (g/cm$^3$) | | 4.3 | 4.4 | 4.5 | 4.2 | 4.5 | 4.9 | 4.7 | 4.3 |
| | Granule strength (kg/mm$^2$) | | 39 | 43 | 46 | 44 | 45 | 47 | 45 | 42 |
| Three-dimensional molded article (Before heat treatment) | Presence or absence of chipping | | None | None | None | Slight chipping | None | None | None | None |
| Three-dimensional molded article (After heat treatment) | Vickers hardness | | 1239 | 1367 | 1440 | 1382 | 1475 | 1150 | 1395 | 1670 |
| | XRD | Co$_3$W$_3$C/WC | 2.00 | 0.00 | 1.72 | 0.00 | 0.62 | 2.56 | 3.35 | 2.80 |

TABLE 2

| Sample | | | Comp. Ex. 1 | Comp. Ex. 2 | Comp. Ex. 3 | Comp. Ex. 4 |
|---|---|---|---|---|---|---|
| Blended powder | Composition | | Balance WC 17% Co 5% CrC | Balance WC 17% Co 1% VC 5% CrC | Balance WC 17% Co 5% VC 5% CrC | Balance WC 17% Co None None |
| Granulated-sintered powder | Particle size distribution | D3 | 8.3 | 7.9 | 8.0 | 8.7 |
| | | D50 | 15.4 | 15.2 | 14.7 | 16.0 |
| | | D97 | 29.7 | 29.4 | 26.9 | 31.1 |
| | Bulk density (g/cm$^3$) | | 4.0 | 4.0 | 4.0 | 4.9 |
| | Granule strength (kg/mm$^2$) | | 35 | 31 | 37 | 51 |
| Three-dimensional molded article (Before heat treatment) | Presence or absence of chipping | | Large chipping | Large chipping | Occurred | None |
| Three-dimensional molded article (After heat treatment) | Vickers hardness | | 1207 | 1195 | 1607 | 1057 |
| | XRD | Co$_3$W$_3$C/WC | 0.00 | 0.00 | 0.00 | 4.96 |

Figure 2:
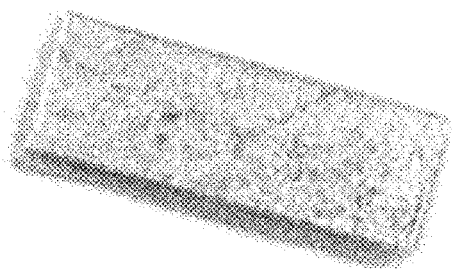
FIG. 2 is a photograph view illustrating a three-dimensional molded article (having no chipping) obtained in Example.
Figure 3:
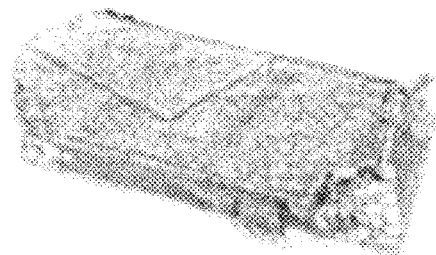
FIG. 3 is a photograph view illustrating a three-dimensional molded article (having chipping) obtained in Comparative Example.

FIG. 2 is a photograph view illustrating the three-dimensional molded article (having no chipping) obtained in Example 1. FIG. 3 is a photograph view illustrating the three-dimensional molded article (having chipping) obtained in Comparative Example 1.

As illustrated in Table 1 and Table 2, it was found that, when both the vanadium carbide (VC) and the chromium carbide (CrC) were not contained in the powder material, the η phase was generated. Moreover, it was found that, when at least one of the vanadium carbide and the chromium carbide was contained in the powder material, the generation of the η phase was suppressed. In the three-dimensional molded article of cemented carbide, the η phase is a fragile phase, and thus it is preferable that the η phase is not present.

As illustrated in Table 1 and FIG. 2, it was found that, when the content of the chromium carbide in the blended powders (form of the primary particles) was less than 5% by mass, the occurrence of cracking or chipping was suppressed in the three-dimensional molded article. As illustrated in Table 2 and FIG. 3, it was found that, when the content of the chromium carbide in the blended powders was 5% by mass or more, cracking or chipping was likely to occur in the three-dimensional molded article.

Figure 4:
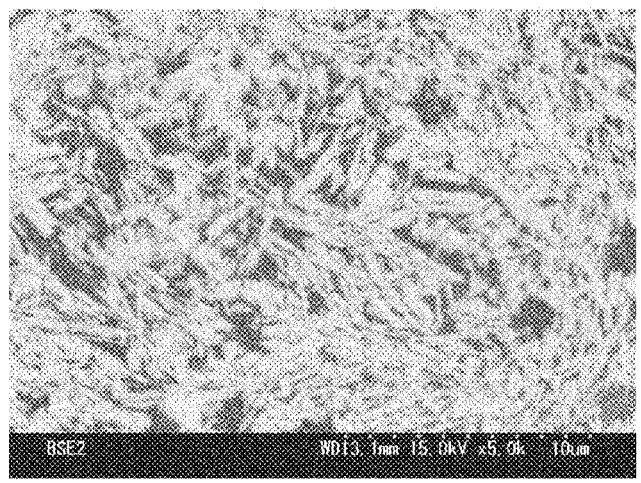
FIG. 4 is an SEM image illustrating the cross section of a three-dimensional molded article (after heat treatment) obtained in Example in an enlarged manner.
Figure 5:
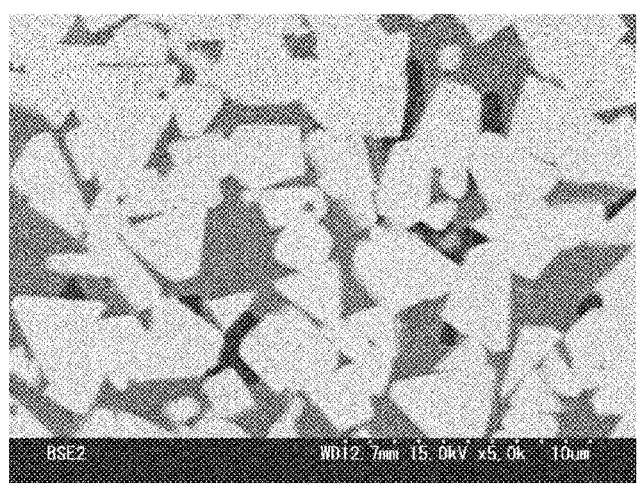
FIG. 5 is an SEM image illustrating the cross section of a three-dimensional molded article (after heat treatment) obtained in Comparative Example in an enlarged manner.

FIG. 4 is an SEM (Scanning Electron Microscope) image in which the cross section of the three-dimensional molded article (after the heat treatment) obtained in Example 2 is illustrated in an enlarged manner. FIG. 5 illustrates an SEM image in which the cross section of the three-dimensional molded article (after the heat treatment) obtained in Comparative Example 4 is illustrated in an enlarged manner. In FIG. 4 and FIG. 5, a white portion is the tungsten carbide (WC) and a black portion is the cobalt (Co). In the three-dimensional molded article of cemented carbide, there is a tendency that the entire hardness is higher when the tungsten carbide is finer and more uniformly distributed. It is understood from a comparison between FIG. 4 and FIG. 5 that the tungsten carbide is finer and more uniformly distributed in Example 2 than in Comparative Example 4, and therefore the entire hardness of Example 2 is higher. This is understood also from the numerical values of the Vickers hardness illustrated in Table 1 and Table 2.

The present inventors obtained the following findings from the measurement results of Examples 1 to 8 and Comparative Examples 1 to 4.

(Particle Growth of WC)

The vanadium carbide (VC) affects the average particle diameter of the tungsten carbide (WC) in the granulated-sintered powder (form of the secondary particles). The average particle diameter of the tungsten carbide in the granulated-sintered powder tends to decrease with an increase in the content of the vanadium carbide in the blended powders (form of the primary particles) from 0% by mass. More specifically, the vanadium carbide has a function of suppressing the particle growth of the tungsten carbide. On the other hand, with respect to the chromium carbide (CrC), the function of suppressing the particle growth of the tungsten carbide is low. The VC is effective for the suppression of the particle growth of the WC.

(Control of η Phase)

When the chromium carbide is contained in the blended powders, the generation of the η phase is suppressed. When the content of the chromium carbide in the blended powders is 5% by mass, the η phase was not confirmed. On the other hand, with respect to the vanadium carbide, even when the content is 5% by mass, the η phase was confirmed. The chromium carbide is effective for the suppression of the η phase.

(Denseness)

In the blended powders, when the content of the chromium carbide is 5% by mass, cracking or chipping occurs in the three-dimensional molded article and the moldability also deteriorates. Therefore, the content of the chromium carbide is preferably less than 5% by mass. This can improve the denseness and the moldability of the three-dimensional molded article.

DESCRIPTION OF REFERENCE NUMERALS 10 molding area
11 wiper
12 stock
13 solidifying means
14 lifting table
20 powder material
21 powder solidified layer

What is claimed is:

1. A powder material for additive layer manufacturing used to manufacture a three-dimensional shaped molded article by irradiation with a laser light or an electron beam, the powder material comprising:
    cobalt;
    a first component comprising vanadium carbide;
    a second component serving as a carbon supply source, wherein a content of the second component is less than 5% by mass, wherein the second component consists of carbon; and
    a balance of tungsten carbide, wherein
    a content of the first component is 0.6% by mass or more and 5% by mass or less.

2. The powder material according to claim 1, wherein the content of the second component is 1% by mass or more and 3% by mass or less.

3. The powder material according to claim 1, wherein the content of the first component is 1% by mass or more and 3% by mass or less.

4. A method for manufacturing a molded article comprising:
    performing three-dimensional molding using the powder material according to claim 1 by irradiation with a laser light or an electron beam.

5. The powder material according to claim 2, wherein the content of the first component is 1% by mass or more and 3% by mass or less.

6. A method for manufacturing a molded article comprising:
    performing three-dimensional molding using the powder material according to claim 2 by irradiation with a laser light or an electron beam.

7. A method for manufacturing a molded article comprising:
    performing three-dimensional molding using the powder material according to claim 3 by irradiation with a laser light or an electron beam.

8. The powder material according to claim 1, wherein the first component consists of vanadium carbide.

* * * * *